(12) United States Patent
Schmit et al.

(10) Patent No.: US 6,598,800 B1
(45) Date of Patent: Jul. 29, 2003

(54) ANIMAL TAG

(75) Inventors: Paul F. Schmit, O'Fallon, MO (US); Mark M. Greer, O'Fallon, MO (US)

(73) Assignee: Data2 Incorporated, St. Peters, MO (US)

( * ) Notice: Subject to any disclaimer, the term of this patent is extended or adjusted under 35 U.S.C. 154(b) by 0 days.

(21) Appl. No.: 10/066,899

(22) Filed: Feb. 4, 2002

(51) Int. Cl.[7] .................................................. G06K 7/10
(52) U.S. Cl. ................................ 235/462.44; 235/487
(58) Field of Search ............................. 235/487, 462.44

(56) References Cited

U.S. PATENT DOCUMENTS 5,725,261 A * 3/1998 Rahn .......................... 235/487

OTHER PUBLICATIONS

US 6,330,759, 12/2001, Wikan (withdrawn)

* cited by examiner

*Primary Examiner*—Harold I. Pitts
(74) *Attorney, Agent, or Firm*—Polster, Lieder, Woodruff & Lucchesi, L.C.

(57) ABSTRACT

An animal tag having a keeper portion and a clear plastic case or panel through which a barcode can be read, with a pocket in which a barcode label is sealed. The barcode label has on it a barcode viewable through a wall of the case. The label is preferably self-supporting and may carry an RFID chip.

23 Claims, 1 Drawing Sheet

ANIMAL TAG

BACKGROUND OF THE INVENTION

Ear tags to identify a particular animal and to provide information about the animal are in common use. As presently constituted, an ear tag is a plastic plate with a receiver in the form of a cup with an annular rib at its mouth. A stud, with a spear point with an undercut to provide a ledge engaging the cup rib, is pushed through the ear of the animal and into the cup, where it is held fast by the engagement of the annular rib and spear point ledge. Information about the animal is printed on the plate. For a discussion of such tags see, for example, U.S. Pat. No. 6,330,759. As the need for information has increased, the tags have become more complicated, and presently it has become desirable to present the information in the form of a barcode or an RFID (radio frequency identification) chip. To be fully useful, the barcode or RFID chip must be readable with commercial scanners. Typically, barcodes are black bars printed over a white substrate, because one of the requirements for reading a barcode is a large contrast between a bar and a substrate. The width of the bars and spaces is equally important. In order that the barcode carry the desired information reliably, the relationship of the bar and space width must be maintained. Any "bleeding" of the bar into a space can result in a misread or the production of faulty information.

In many instances, it is also desirable to have the tags differently colored, to add a quick and easy identification of groups of animals, for instance, to tell whether a litter of pigs was farrowed by a particular sow, or whether all the cattle in a particular feed lot or pen are from the same farm.

Currently, when the coded information on an animal tag is a barcode, several problems have arisen, such, for example, as that the bars have fuzzy edges and bleed into the spaces between the bars. This appears to the barcode reader as a wide bar rather than the desired narrow bar or as a narrow space rather than a wide space. This leads to misreads and/or faulty information. Another problem is a lack of contrast between the black bars and the panel color itself. When the bar code is printed directly onto the panel of the tag, the method of printing is generally not suitable to produce crisp, sharp images which can be read by a scanner easily and quickly.

In many cases, the tags remain on the animal for some considerable period of time. Even if the bar code can easily be read at the time of attachment, the information can fade with time, or can be rendered difficult to read as the tag experiences the normal wear and tear of everyday use. Although thin, clear plastic film overlays have been bonded to the tag to help prevent false readings, these films offer only limited protection. Young pigs, for example, which chew on anything in reach, can destroy such films, or thin tags in a short time.

One of the objects of this inventions is to provide a tag that can be color coded, that can be read quickly without misreads, and one that can remain attached to an animal for a long period of time without becoming illegible when scanned with a commercial barcode scanner.

Other objects will become apparent to those skilled in the art in the light of the following description and the accompanying drawing.

BRIEF SUMMARY OF THE INVENTION

In accordance with this invention, generally stated, an animal tag is provided in the form of a durable, plastic tag of substantial thickness but transparent to a barcode reader. In the preferred embodiment, the tag has a pocket that is initially open al least one side, to receive a label. Although in the preferred embodiment, the label is a barcode label, the label can either carry a bar code and an RFID chip, or one of them. After a label is inserted into the pocket, the open edge or edges of the pocket are sealed, as by heat sealing, to form a water-tight cavity. The label, being separately printed, can display a barcode with clean, sharp bars and spaces, in contrasting black and white. The bar code can be read easily through the transparent walls of the panel, and the barcode will remain legible for long periods of time. Preferably the plastic of which the tag is made will contain UV absorbing material, and the label itself can contain or be coated with UV absorbing material to protect against damage from sunlight. Preferably, the label is made of vinyl and is relatively stiff, to facilitate its insertion into the pocket and to maintain its integrity, in case the plastic of which the tag is made is somewhat permeable to moisture. The label can be made in any color, and either a blank white area provided in the otherwise solid color label, to receive the bar code, or the bar code can be printed separately and adhered to the rest of the label. A barcode can be printed on either one or on both sides of the label. In another embodiment, the tag is made by a process of insert molding, in which the label is placed in a mold, and the mold is then filled around the label with the plastic that is transparent to the bar code reader. Alternatively, one wall of the transparent plastic can be placed in the mold, the label laid on it, and the second wall cast on the first, bonding to the first wall around the label. In yet another embodiment, one wall can be made with a shallow recess to receive the label, and the other wall, placed over the label and adhered or bonded to the first wall, or even heat sealed or otherwise sealed around the edges of the tag. In any case, the resultant tag has a barcode label encapsulated in a pocket. The embodiments in which the label is molded in the tag have the double advantage of not requiring the label to be inserted into a slot, and of forming a watertight seal without the additional step of heat sealing an open slot after the label is placed in the pocket. It has the disadvantage of requiring that all of the information carried by the bar code label be known and entered when the tag is made, whereas with the preferred embodiment, the bar code label can be printed substantially contemporaneously with the end use, and therefore, can easily be tailored to a particular animal or characteristic small group.

DESCRIPTION OF INVENTION

Figure 1:
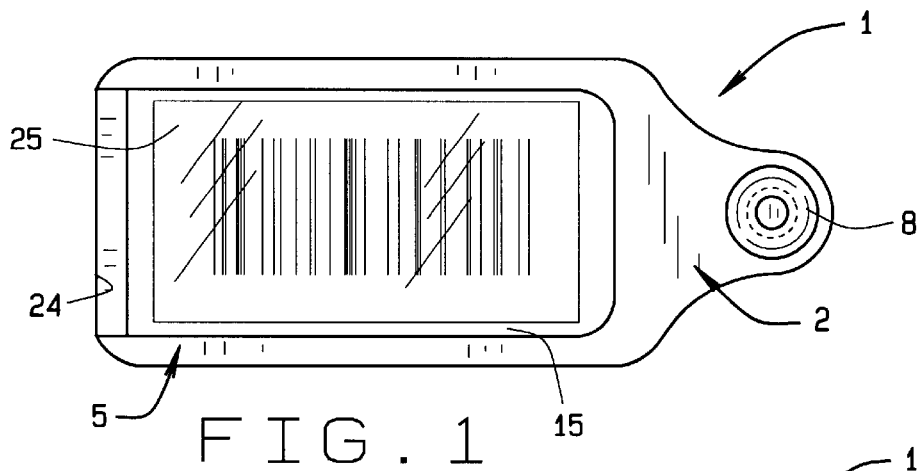
FIG. 1 is a top plan view of one embodiment of tag of this invention.
Figure 2:
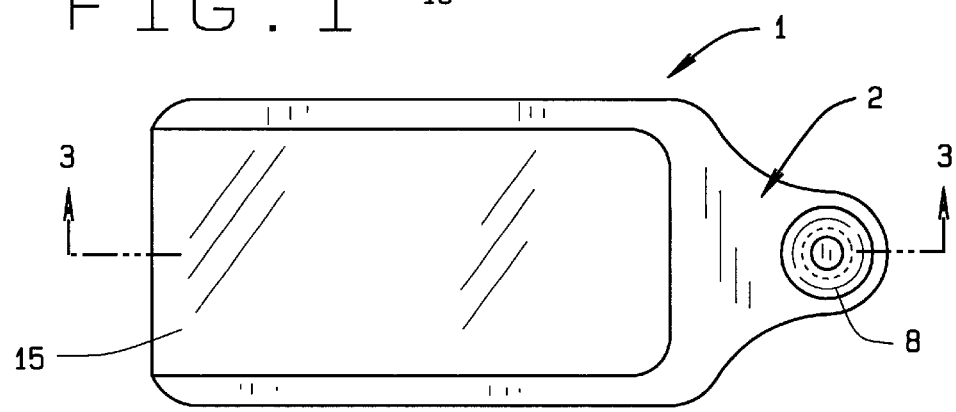
FIG. 2 is a top plan view of the tag before a label is inserted.
Figure 3:
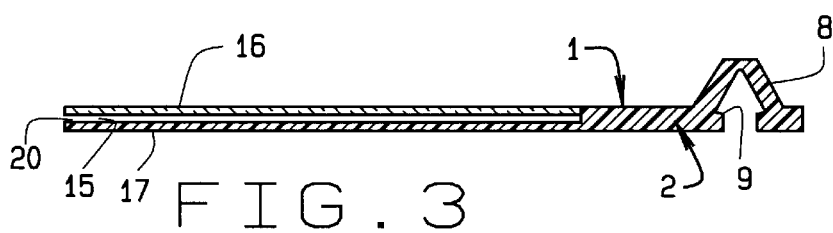
FIG. 3 is a sectional view taken along the line 3—3 of FIG. 2.
Figures 4, 5, 6:
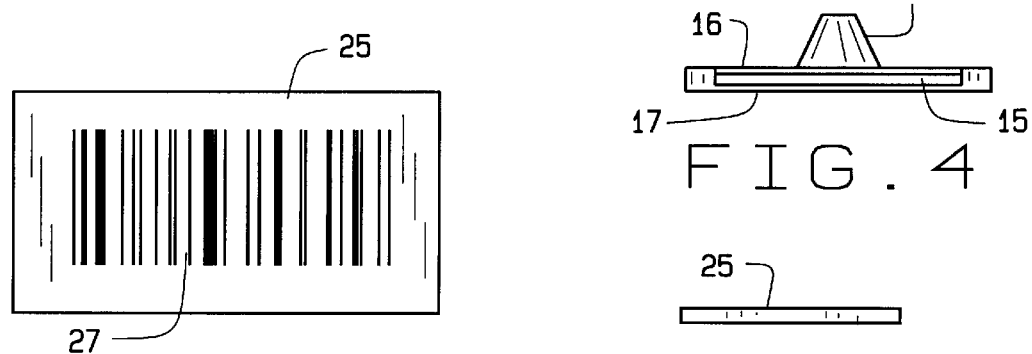
FIG. 4 is a view in end elevation viewed from left to right of FIG. 2.
FIG. 5 is a top plan view of a label before it is inserted into a pocket in the tag.
FIG. 6 is a view in end elevation of the label shown in FIG. 5.

Referring now to the drawings for one illustrative embodiment of tag of this invention, reference numeral 1 indicates a completed tag. Tag 1 has a keeper portion 2 and a panel or case portion 5. The keeper portion 2 is generally conventional, with a cap part 8 open at its bottom and closed at its top, with an annular rib 9 at its open end, to engage the underside of a spear point of a stud.

The panel portion 5 in the embodiment shown is generally elongatedly rectangular, and has in it a pocket 15 with an upper wall 16 and a lower wall 17, defining between them a slot 20. In this embodiment, the slot 20 is closed at its end next to the keeper portion, and along two long sides of the panel portion, and, initially, open at its far end 24. A label 25, with a barcode 27 or an RFID chip, or both, on at least one side, is preferably self supporting in the sense that when it is held at one end, it does not sag. The label 25 is sized to fit in the slot 20, into which it is inserted as shown in FIG. 1. After the label 25 is inserted, the open end 24 of the slot 20 is sealed, as by heat sealing, to encapsulate the label.

The tag 1 is preferably injection molded of clear plastic such as polyurethane, polyethylene or polypropylene, for example, with sufficient and suitable ultraviolet light absorbers to protect the printing on the label from fading when exposed to sunlight. The label 25 is preferably made of a durable, waterproof material, such as a cross-laminated, oriented polyethylene (Valeron), a rigid vinyl, a high Shore D polyurethane film or a polypropylene film. The label 25 may also contain or be coated with UV absorbers. Suitable UV inhibitors or absorbers for both tag and label are well known; for example, inhibitors sold by Ciba Specialty Chemicals under the mark Tinuvin, and those sold by Akzo Nobel under the mark Akcrostab.

The label is preferably flood coated with any desired color on both sides. On one or both sides of the label a solid white block is also printed to provide the necessary contrast for a barcode to be applied. Any of several methods for applying the barcode can be employed, as for example by thermally transfer printing the white block, or by using an ink jet printer for that purpose. Still another method is to use a photocomposed barcode image panel and bonding the barcode panel to the label with a suitable adhesive. In the latter method, no white block need be printed.

The tag is preferably about 70 mils thick, each of the walls 16 and 17 being about 30 mils thick, and the slot about 10 mils high. However, those dimensions can vary widely, depending upon the use to which the tag is to be put. The preferred range of thickness of the tag, to ensure rigidity and durability, is 50 to 80 mils, the walls above and below the label being in the range of 20 to 35 mils thick. The tag should be rigid enough to maintain its integrity in use, to the extent that the barcode remains readable and the tag, untorn.

Numerous variations in the construction and method of this invention within the scope of the appended claims will occur to those skilled in the art in light of the foregoing disclosure. The shape and size of the tag can be varied. The slot can be made thinner or thicker, depending upon the size of the label. The slot can be open initially on three sides, and one wall can be integrally hinged with a groove or fold line along the closed edge, in which case, the wall can be swung back to permit easy placement of the label, which can be provided with a spot of light adhesive to hold it in place while the edges of the slot are sealed, as by heat sealing. If color coding is not important, the label can be made uniformly white, in which case no white block need be printed (or left, if the label is colored by printing in a way such as to frame the white area). As has been indicated, the label can also be coated with a clear ultraviolet light absorber, preferably after the bar code has been applied. Although heat sealing is the preferred method of encapsulating the label, other ways of accomplishing the encapsulation, such as the use of a sealant, can be used. As has also been suggested, the label can have a barcode on both sides, the case or panel being transparent, so that the code can be scanned from either side. Those bar codes can be identical or different. The plastic of which the tag is made has been described as transparent or clear. Although in the preferred embodiment the plastic is, transparent to the eye, if the bar code scanner is capable of reading the code, or the RFID reader capable of reading the information on the RFID chip through a plastic that is translucent or colored, it is only necessary that the plastic be transparent to the bar code scanner or RFID chip reader. As was described in the brief description of the invention, the label can be encapsulated in a fully sealed pocket in the course of molding the tag plate, or confined to a shallow recessed pocket in one plate and covered by the second, cover, plate of substantial thickness. In either case, the tag should still be of substantial thickness and rigidity, so as to retain its integrity and readability. An RFID chip can be attached to either side of the barcode label, and the combination inserted in the slot or placed in the mold to be insert molded, or in the depression in the tag before a cover is sealed over the tag. The RFID chip can be inserted on a label without a bar code, although that is not done presently. Although preferably the keeper portion of the tag is made integral with the plate portion and of the same material, the keeper portion can be made of different material, the construction of the keeper portion forming no part of this invention. These variations are merely illustrative.

Having thus described the invention, what is claimed and desired to be secured by Letters Patent is:

1. An animal tag comprising a keeper portion and a plastic case through which a barcode can be read with a commercial scanner, said case having a pocket in which a barcode label is sealed completely, said label bearing a barcode viewable by said scanner through a wall of said case.

2. The animal tag of claim 1 wherein the case contains an ultraviolet light absorber.

3. The animal tag of claim 1 wherein the bar code label is coated with an ultraviolet light absorber.

4. The animal tag of claim 1 in which the plastic case initially has a slot, closed on three sides and open on one side, into which the bar code label is inserted before the open side is sealed.

5. The animal tag of claim 4 wherein the pocket is elongatedly rectangular and initially open at a short end of the pocket, and the keeper portion, with a stud receiving receptacle, is at a closed, short end of said pocket.

6. The animal tag of claim 5 wherein the open end of the pocket is heat sealed.

7. The animal tag of claim 1, wherein walls overlying said label are on the order of 20 to 40 mils thick.

8. The animal tag of claim 1 wherein the label is a self-supporting plastic label.

9. The animal tag of claim 1 wherein the label is color coded.

10. The animal tag of claim 9 herein the label is colored, but with a white area in which the bar code appears.

11. The animal tag of claim 9 wherein the label is uniformly colored, and a separate bar code panel is adhered to it.

12. A method of producing an animal tag comprising forming, in a plastic tag transparent to a barcode scanner, a pocket with at least one opening through which a label can be passed, providing on said label a barcode, inserting said label into said pocket with the barcode visible to said scanner through said plastic, and sealing said at least one opening.

13. The method of claim 12 wherein the label has two broad sides and a bar code appears on both of said sides.

14. The method of claim 12 herein the said label is formed with a white area and said bar code is printed on said white area.

15. The method of claim 12 wherein the label is formed of self-supporting plastic.

16. The method of claim 12 wherein said label is color coded.

17. The method of claim 16 wherein said label is uniformly colored and said bar code is on a separate panel and adhered to said label.

18. A method of producing an animal tag comprising molding a self-supporting plate and encapsulating a barcode label in a pocket of said plate, said plate being formed of a plastic transparent to a barcode scanner, and being on the order of 50 to 80 mils thick, walls overlying the label being on the order of 20 to 40 mils thick.

19. An animal tag comprising a keeper portion having a stud receiver, and a plastic case through which a bar code can be read with a commercial scanner, said case having a pocket in which a self-supporting plastic bar code label is sealed, said label bearing a bar code viewable by said scanner through a wall of said case, said plastic case containing sufficient of an ultraviolet light inhibitor to protect said label, and said label being provided with an ultraviolet light inhibitor, said pocket being elongatedly rectangular, with said keeper portion being at a closed short end of said pocket and, initially, with an open end of said pocket at the short end of the pocket opposite the keeper portion, which is heat sealed after the bar code is in place.

20. The animal tag of claim 1 wherein the keeper portion is integral with said plastic case.

21. The animal tag of claim 1 wherein the label includes an RFID chip.

22. An animal tag comprising a keeper portion and a rigid plastic case, said case having a pocket in which a self-supporting label is sealed, said label bearing an RFID chip readable from outside said case.

23. The method of the claim 18 wherein the barcode label is self-supporting, is placed in a mold, and the plastic of which the plate is formed is molded around the label.

* * * * *

UNITED STATES PATENT AND TRADEMARK OFFICE
CERTIFICATE OF CORRECTION

PATENT NO. : 6,598,800 B1
DATED : July 29, 2003
INVENTOR(S) : Paul F. Schmit and Mark M. Greer It is certified that error appears in the above-identified patent and that said Letters Patent is hereby corrected as shown below:

Column 1,
Line 66, replace "inventions" with -- invention --

Column 2,
Line 3, replace "al least" with -- along at least --

Column 3,
Line 50, replace ". untom" with -- , untorn --

Column 4,
Line 9, replace "is, transparent" with -- is transparent --
Line 56, replace "herein" with -- wherein --

Column 5,
Line 3, replace "herein" with -- wherein --

Column 6,
Line 18, replace "of the claim" with -- of claim --

Signed and Sealed this

Sixteenth Day of September, 2003

JAMES E. ROGAN
*Director of the United States Patent and Trademark Office*